April 7, 1936.  A. J. FRIESEL ET AL  2,036,403
BREAD SLICING MACHINE
Filed Aug. 9, 1932  3 Sheets-Sheet 3

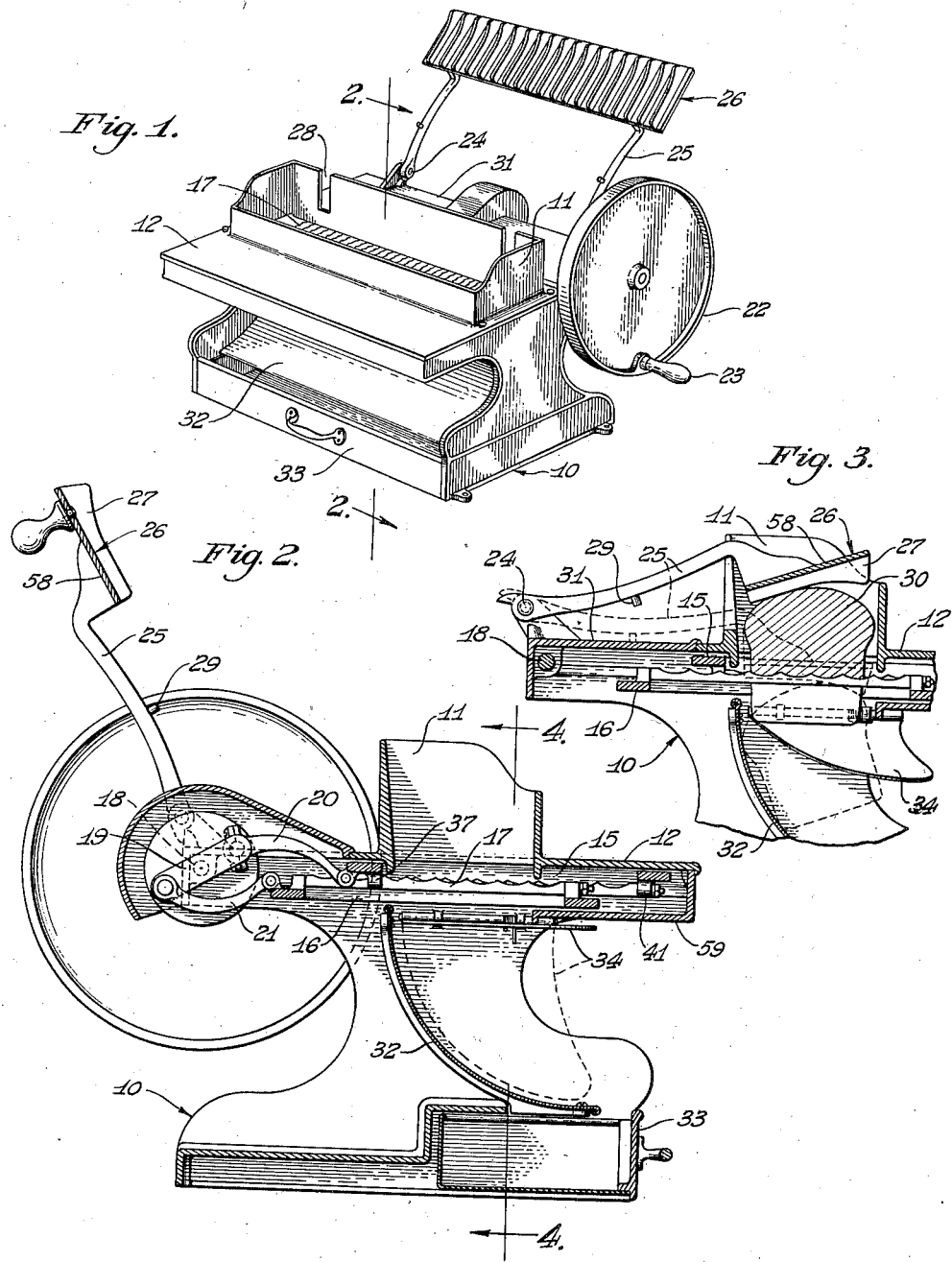

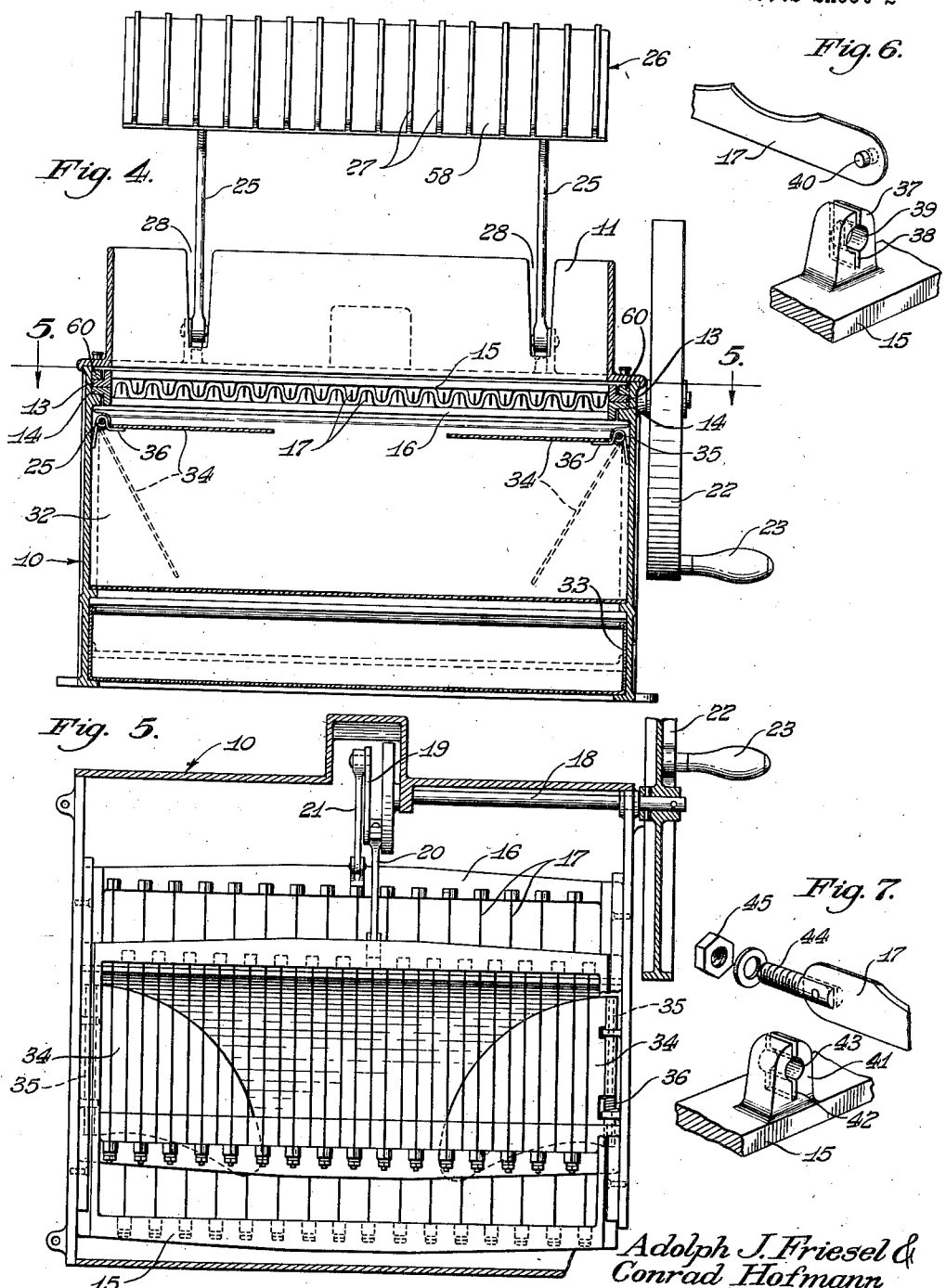

Adolph J. Friesel &
Conrad Hofmann
INVENTORS

BY Victor J. Evans & Co.
THEIR ATTORNEYS

Patented Apr. 7, 1936

2,036,403

UNITED STATES PATENT OFFICE 2,036,403

BREAD SLICING MACHINE

Adolph J. Friesel and Conrad Hofmann, Chicago, Ill.

Application August 9, 1932, Serial No. 628,082

3 Claims. (Cl. 146—151)

This invention relates to improvements in bread slicing machines, and more particularly to that type of machine wherein the bread is automatically urged thru the slicing instrumentality.

Heretofore various types of machines for the slicing of loaves of bread have been proposed incorporating mechanism for feeding the loaves, one at a time, through reciprocating knife blades, rotating circular cutters or other similar slicing instrumentality.

Of the proposed feeding mechanisms, some employ power driven pusher plates for urging the bread through the moving knives, while some utilize manually depressed pusher plates. These types of feeding mechanisms, while they may be practical for use with certain food stuffs or bread of a predetermined consistency as to grain and moisture of both inner cellular structure and crust, have been found to be highly impractical, when operable at all, for use with the average range of breads making up the more common varieties found in small bake shops and food stores. This inefficiency in performance seems to be due at least in part, to the inability of the slicing knives to cut through the relatively soft cellular portion of the loaf at more than a fixed rate of speed for the particular consistency of the loaf without causing the cells to collapse. Consequently the rate of feed must depend upon the variety and condition of the loaf and must at all times approach the maximum feeding rate in order to lend efficiency in operation to the machine performing the slicing operation.

An object of our invention is to provide a bread slicing machine wherein the loaf of bread is caused to be fed through the reciprocating knives at a rate of speed determined by the physical characteristics of the bread, thereby to produce uniform and clean-cut slices free of crushed or ragged portions in a minimum amount of time.

Another object is to provide an automatic bread slicing machine wherein the relative pressure between the loaf and the cutting edges of the slicing knives remains constant throughout the entire slicing operation.

A further object is to provide a bread slicing machine wherein free access to the slicing knives for inspection and sharpening is at all times available yet wherein accidental contact with the cutting edges of the knives during operation of the machine is entirely precluded.

Other objects, the advantages, and uses of the invention will become apparent from a reading of the following specification and claims and after consideration of the accompanying drawings forming a part of the specification wherein:—

Fig. 1 is a perspective view of one form of the machine;

Fig. 2 is a vertical section on line 2—2 in Fig. 1;

Fig. 3 is a vertical sectional detail view;

Fig. 4 is a vertical section on line 4—4 in Fig. 2;

Fig. 5 is a horizontal sectional view on line 5—5 in Fig. 4;

Figs. 6 and 7 are perspective detail views of means for mounting the slicing knives on the reciprocatory frames;

The power-driven form of the machine, shown in Figs. 8 to 11 inclusive, is substantially the same as the manually operated form of the machine shown in Figs. 1 to 7 inclusive, and hence the same reference characters will be applied to indicate like parts in both forms of the machine.

Figure 8:
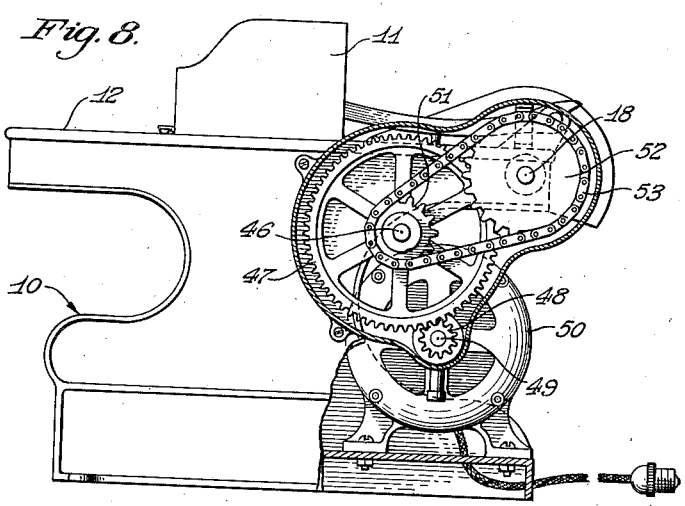
Fig. 8 is a side elevational view of the power-driven form of the machine.
Figure 9:
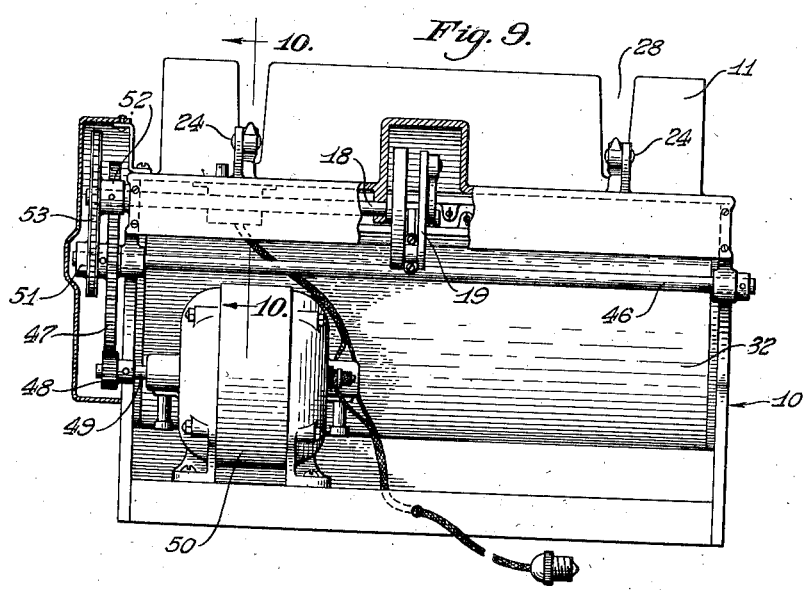
Fig. 9 is a rear elevational view, partly in section, of the power-driven form of the vehicle shown in Fig. 8.

Our improved bread slicing machine comprises a frame generally indicated at 10. Formed upon this frame is a hopper 11 in front of which is a shelf 12 upon which the loaves of bread may be disposed prior to being manually delivered to the hopper 11.

Arranged to reciprocate across the bottom of the hopper 11, one above the other, are two horizontally slidable knife-carrying substantially rectangular frames 15 and 16. These frames 15 and 16 have lateral flanges 13 and 14, respectively, which travel in horizontal guideways 60 formed on the frame 10 (Fig. 4). Carried by the knife frames 15 and 16 are undulated edged slicing knives 17. A rotative shaft 18 is journaled in the frame 10. Associated with the shaft 18 and frames 15 and 16 are conventional means for translating rotary motion of shaft 18 into reciprocatory rectilinear motion of the knife-carrying frames 15 and 16. This means includes a double throw crank 19 carried by the shaft 18. One end of the double throw crank 19 is connected by a rod 20 to the knife frame 15 and the other end of the throw 19 is connected by a rod 21 to the knife frame 16 whereby to convert rotary motion of the shaft 18 into reciprocatory rectilinear motion of the knife-carrying frames 15 and 16. Attached to the outer end of the shaft 18 is a flywheel 22 carrying a handle 23 by means of which the shaft 18 may be manually operated.

A loaf pusher generally indicated at 26 including a relatively heavy cast plate 58 is pivotally mounted upon the frame 10 through the medium of a pair of spaced apart rearwardly extending arms 25 which may, if desired be cast integrally with the plate 58. Slots 28 are provided in the rear upright wall of the hopper 11 to establish clearance for the arms 25 as the pusher plate descends within the hopper 11 as by the force of gravity acting upon the mass of the plate 58 during the slicing of a loaf of bread previously placed beneath the plate as shown in Fig. 3. The pusher plate is prevented from engaging with the knives 17 by stop lugs 29 carried upon the arms 25. When the pusher plate has completed its operation of urging a loaf of bread thru the moving slicing knives the stop lugs 29 abut a horizontal portion 31 of the frame 10 of the machine thereby arresting further descent of the pusher plate toward the knives. As may be noted from an inspection of Fig. 3 the plate 58 of the loaf pusher is of such size as to virtually close the hopper 11 as it descends therein and to adequately guard the opening of the hopper from the time of initial placement upon the loaf until it actually enters the hopper. This arrangement precludes the inadvertent placing of the hands of the operator into contact with the cutting edges of the knives 17 at any time during the operation of the machine.

The force of gravity acting upon the relatively heavy pusher plate 58 and also upon the loaf of bread provide the sole motive power for urging the bread through the reciprocating slicing knives 17. The rate of travel of the bread through the slicing knives under the influence of the gravitationally actuated pusher plate may therefore bear a definite relationship to the physical characteristics of the bread. This arrangement provides for highly efficient performance, hastening the slicing operation where the nature of the loaf permits and slowing up the operation at other times where forceful feeding of the loaf would undoubtedly result in torn and otherwise mutilated slices.

Figures 10, 11:
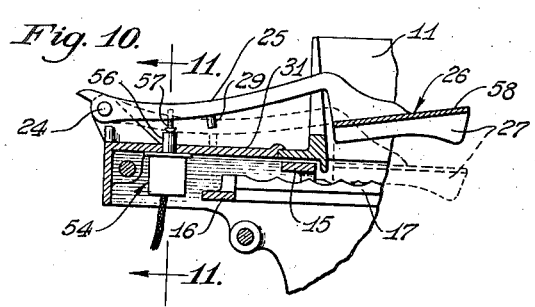
Fig. 10 is a sectional detail view on line 10—10 in Fig. 9, showing the novel combination of loaf pusher and motor circuit control mechanism associated therewith.
Fig. 11 is a sectional detail view on line 11—11 in Fig. 10.

To assist in urging the loaf through the reciprocating knives into the compartment beneath where the sliced loaf may be withdrawn for use, spaced parallel fin members 27 are provided on the under side of the pusher plate 58. These fin members are so spaced on the pusher plate that as the plate descends to its lowermost position the fins 27 pass beyond the cutting edges of the knives as shown in Fig. 11.

As the slices emerge from the knives they fall by gravity down an inclined chute 32 from which the operator takes them at the front of the machine; the crumbs falling from the bottom of the chute 32 into a crumb tray 33.

To keep the slices together in parallelism as they emerge from the slicing knives 17 and fall down the chute 32 we provide a pair of wing members 34 which are pivotally mounted at 35 on the frame 10 below the knives 17. These wing members 34 are urged into horizontal position, parallel to each other, (full line position, Figs. 2 and 4) by means of springs 36, and as the slices emerge from the knives 17 they bear upon these wing members 34 which are forced down, into dotted line position, (Figs. 2 and 4) against the action of the springs 36. As the wing members 34 are forced down against the action of springs 36 they bear against the end slices of the loaf and keep the slices all together and in parallelism as they fall down the chute 32 so that the slices are delivered off the chute 32 to the front of the machine conveniently and properly arranged to be grasped as one unit by the operator for wrapping. The wing members 34 when in raised horizontal position abut the bottom 59 of the shelf 12 and are thus prevented from engaging the knives 17.

To mount the rear and front ends, respectively, of the knives 17 on the frames 15 and 16 we provide the means shown in Figs. 6 and 7. To this end we provide bosses 37 on the rear bar or end of each of the knife frames 15 and 16 (Fig. 6) and in each of these bosses 37 is a vertical slot 38 for the reception of the end portion of a blade 17. Extending horizontally part way through each boss 37 is an aperture 39 which is closed at its inner end. These apertures 39 receive lugs 40 provided on the knives 17.

On the front end or bar of each of the frames 15 and 16 we provide bosses 41, each of which has a vertical slot 42 formed therein for the reception of the front end portion of a knife 17. Extending horizontally completely through each boss 41 is an aperture 43; each of which apertures 43 is adapted for the reception of a bolt 44 having a bifurcated end portion attached to a blade 17. These bolts are secured in the apertures 43 by nuts 45.

As has been heretofore stated, the machine we show in Figs. 8 to 11 inclusive is substantially the same as the machine shown in Figs. 1 to 7 inclusive, except that the machine shown in Figs. 8 to 11 is power driven. To this end an auxiliary shaft 46 is journaled in the machine parallel to shaft 18. On this shaft 46 is provided a gear 47 which meshes with a gear 48 on the shaft 49 of an electric motor 50 that is mounted on frame 10 at the rear of the machine. A sprocket 51 is provided on the shaft 46 and a sprocket 52 is provided on shaft 18. Traveling over these sprockets 51 and 52 is a chain 53 so that when the motor 50 is operated power is transmitted from the motor shaft 49, through gear 48 to gear 47 and shaft 46, and thence from shaft 46 through sprocket 51, chain 53, and sprocket 52 to shaft 18 which is thereby rotated. The rotary motor of shaft 18 is converted into reciprocatory rectilinear motion of the knife frames 15 and 16 by the conventional translating means hereinbefore described and including the throw 19 and rods 20 and 21.

Mounted on the shelf 31 is a conventional control switch 54 for the motor 50. This control switch includes a pair of make and break buttons 55 and 56. When the slicing operation is about completed a projecting element 57 on one of the pusher arms 25 engages the circuit opening button 56 and breaks circuit to the motor 50 which is thus automatically shut off by the loaf pusher as the slicing operation is completed. To restart the motor the other button 55 is manipulated, thereby forcing the button 56 back into position to be reengaged by the projecting element 57 at the end of the next slicing operation.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. A bread slicing machine comprising, a plurality of spaced-apart slicing knives, means for moving the knives in parallel reciprocating paths, means including a gravity operated weight for urging a loaf of bread against and past said moving knives, and means located beyond the knives in the direction of travel of the bread for applying thrust upon the opposite ends of the sliced loaf as it passes beyond the knives, said means including pivotally mounted spring actuated pressure members adapted normally to lie across the direction of travel of the bread and to swing upon their pivotal mountings against the force of their spring actuating means yieldingly to engage the opposite ends of the sliced loaf as it passes beyond the slicing knives and bears thereupon.

2. A bread slicing machine comprising, a frame, a plurality of parallel spaced-apart slicing knives mounted for movement upon said frame with their cutting edges facing upwardly, means for moving said knives in parallel reciprocating paths, certain of the knives moving in a direction opposite to the direction of movement of the remainder of the knives, guide means for restraining a loaf of bread against displacement in a plane parallel with the knives when said loaf is placed upon the cutting edges of the knives, and means, operative concomitantly with but independently of said knife moving means, for urging a loaf of bread against and past said moving knives including a relatively heavy member mounted upon said frame for movement in a generally vertical direction transversely of the direction of movement of said knives under force of gravity and a plurality of spaced-apart fins fixed relatively to said heavy member in parallel spaced-apart relationship and adapted to engage with a loaf of bread placed in contact with said moving knives, said fins being arranged to pass between and partially beyond the knives upon completion of the bread slicing operation.

3. A bread slicing machine comprising, a frame, a plurality of parallel spaced apart slicing knives mounted for movement upon said frame, means for moving said knives in parallel reciprocating paths, and means operative concomitantly with but independently of said knife moving means for urging a loaf of bread against and past the cutting edges of said moving knives, said last named means including a relatively heavy member mounted upon said frame for movement in a generally vertical direction under force of gravity and a plurality of fins fixed relative to said heavy member in parallel spaced apart relationship and adapted to engage with a loaf of bread placed in contact with said moving knives, said fins being arranged to pass between and beyond the cutting edges of said knives upon completion of the bread slicing operation.

ADOLPH J. FRIESEL.
CONRAD HOFMANN.